G. LITTLE.
Burglar-Proof Doors, Safes, &c.

No. 137,456.  Patented April 1, 1873.

Witnesses,
Chas H Smith
Geo. T. Pinckney

Inventor,
George Little

UNITED STATES PATENT OFFICE.

GEORGE LITTLE, OF RUTHERFORD PARK, NEW JERSEY.

IMPROVEMENT IN BURGLAR-PROOF DOORS, SAFES, &c.

Specification forming part of Letters Patent No. 137,456, dated April 1, 1873; application filed October 25, 1872.

*To all whom it may concern:*

Be it known that I, GEORGE LITTLE, of Rutherford Park, in the county of Bergen and State of New Jersey, have invented an Improvement in Burglar-Proof Doors, Safes, &c., of which the following is a specification:

Great difficulty arises in excluding burglars from safes, &c., because the tools employed by them for drilling, boring, prying, and otherwise forcing the doors and other parts of safes, buildings, &c., are very perfect and efficacious. The object of this present invention is to furnish devices that will make a powerful smell, smoke, and light by chemical action in cases where an attempt is made to rupture any of the parts upon which protection rests, so that the fumes evolved will act to stifle and injure or overcome the burglar; the smell will permeate the building and the surrounding atmosphere to attract attention in the daytime, and also at night; and the fire and light will serve to attract attention and insure assistance; and these, combined or separate, will act to frighten away burglars before they have time to secure plunder.

I make use of chemical substances, such as phosphate of calcium and water, and these are separated by a friable substance, such as glass, that will not be acted upon by the substances themselves, but which will easily break by the jar, strain, or concussion to which the door or safe is usually subjected by burglars, and allow the chemical substances to commingle and produce a pungent, penetrating vapor or smoke, and a light or fire, for the purpose before named.

Figure 1:
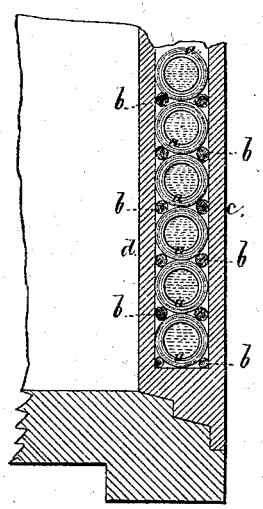
Figure 2:
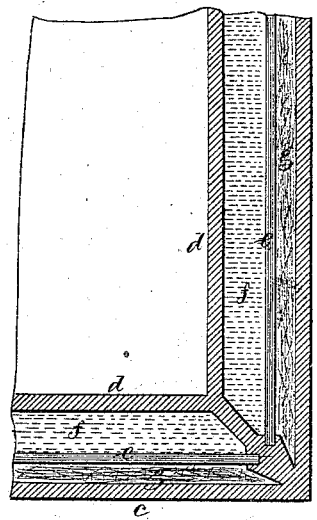

In the drawing I have shown, in Figure 1, a section, in which $a\ a$ represent glass tubes, preferably hermetically sealed at the ends, containing water—preferably salt water—and placed close together; and $b\ b$ represent wicking or fibrous tubes, containing pieces of phosphate of calcium. These are within the two thicknesses $c\ d$ of the door, safe, or partition to be protected. In the section, Fig. 2, the glass plate $e$ is represented as separating the water-receptacle $f$ from the receptacle $g$ containing the chemical substance.

It is to be understood that the safe or door will generally be of the usual construction; and that the parts herein mentioned will be added thereto, or else made at the same time, so as to insure the proper protection; and that when an attempt is made to drill or force open the part that is protected the tools or the concussion will fracture the glass or other brittle material, and allow the liquid to come into contact with the chemical substance, such as phosphate of calcium, and produce a penetrating and odorous vapor or smoke, and also a light, thereby attracting attention or driving away the burglars.

I claim as my invention—

The burglar-protection for doors, safes, &c., consisting of two substances that will combine to produce light, smoke, or vapors, and a separating medium of glass or other easily-broken material, substantially as and for the purposes set forth.

Signed by me this 22d day of October, A. D. 1872.

GEORGE LITTLE.

Witnesses:
 GEO. T. PINCKNEY,
 CHAS. H. SMITH.